(12) United States Patent
Zhong (10) Patent No.: US 10,593,018 B2
(45) Date of Patent: Mar. 17, 2020

(54) PICTURE PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Yu Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 76 days.

(21) Appl. No.: 15/971,800

(22) Filed: May 4, 2018

(65) Prior Publication Data

US 2018/0253824 A1     Sep. 6, 2018

Related U.S. Application Data

(63) Continuation of application No. PCT/CN2017/071753, filed on Jan. 19, 2017.

(30) Foreign Application Priority Data

Jan. 21, 2016 (CN) .......................... 2016 1 0042105

(51) Int. Cl.
  *G06T 3/40* (2006.01)
  *G06T 11/60* (2006.01)
  (Continued)

(52) U.S. Cl.
  CPC .......... *G06T 3/4038* (2013.01); *G06K 9/4604* (2013.01); *G06T 11/00* (2013.01); *G06T 11/60* (2013.01)

(58) Field of Classification Search
  None
  See application file for complete search history.

(56) References Cited

U.S. PATENT DOCUMENTS 10,290,133 B2 * 5/2019 Straub ..................... G06T 11/60
2014/0355962 A1 12/2014 Kim et al.
(Continued)

FOREIGN PATENT DOCUMENTS

CN   101499172 A   8/2009
CN   101794189 A   8/2010
(Continued)

OTHER PUBLICATIONS

Machine Translation of CN105100664, reference previously cited in IDS without machine translation (Year: 2015).*

(Continued)

*Primary Examiner* — Peter Hoang
(74) *Attorney, Agent, or Firm* — Anova Law Group, PLLC (57) ABSTRACT

A picture processing method and apparatus, and a storage medium are provided. First picture information is obtained from a first container, the first picture information being presented as a first picture on a first picture layer. A screenshot picture information is obtained by taking a screenshot of a second container containing a plurality of pictures. The screenshot picture information includes second picture information in the second container, and the second picture information is presented as a second picture on a second picture layer, where the plurality of pictures form sub-pictures of the second picture. The first picture information and the screenshot picture information are combined, to obtain a combined picture of the first picture and the plurality of pictures in a single combining operation.

15 Claims, 3 Drawing Sheets

(51) Int. Cl.
    *G06T 11/00*     (2006.01)
    *G06K 9/46*     (2006.01)

(56) References Cited

U.S. PATENT DOCUMENTS

2015/0213632 A1*   7/2015   Trask ................ G06T 11/60
                                                                    715/234
2016/0004669 A1*   1/2016   Hunter .............. G06F 17/212
                                                                    715/243

FOREIGN PATENT DOCUMENTS

| CN | 102063738 A | 5/2011 |
| CN | 102332158 A | 1/2012 |
| CN | 102479326 A | 5/2012 |
| CN | 102495727 A | 6/2012 |
| CN | 104010212 A | 8/2014 |
| CN | 104424620 A | 3/2015 |
| CN | 105100664 A | 11/2015 |
| CN | 105719240 A | 6/2016 |
| JP | S6454489 A | 3/1989 |

OTHER PUBLICATIONS

The World Intellectual Property Organization (WIPO) International Search Report for PCT/CN2017/071753 dated Mar. 15, 2017 6 Pages (including translation).
The State Intellectual Property Office of the People's Republic of China (SIPO) Office Action 1 for 201610042105.2 Apr. 23, 2018 12 Pages (including translation).

* cited by examiner

PICTURE PROCESSING METHOD AND APPARATUS, AND STORAGE MEDIUM

RELATED APPLICATION

This application is a continuation application of PCT Patent Application No. PCT/CN2017/071753, filed on Jan. 19, 2017, which claims priority to Chinese Patent Application No. 201610042105.2, entitled "PICTURE PROCESSING METHOD AND APPARATUS" filed with the Chinese Patent Office on Jan. 21, 2016, which is incorporated by reference in its entirety.

FIELD OF THE TECHNOLOGY

This application relates the field of image processing and, specifically, to a picture processing method and apparatus, and a storage medium.

BACKGROUND OF THE DISCLOSURE

As a requirement of current picture processing, multiple pictures may be superimposed on a base picture. The user may zoom in, zoom out, or rotate these pictures so that the multiple superimposed pictures and the base picture can be combined into one picture to be outputted.

Usually, when combining N (N is greater than 2) pictures into one picture, the pictures need to be combined one by one. That is, the combining operation needs to be performed for (N−1) times. The large number of combining operations can lead to a large amount of memory being occupied in a terminal, increasing operation time.

The disclosed methods and systems are directed to solve one or more problems set forth above and other problems.

SUMMARY

According to one aspect of the embodiments of this application, a picture processing method is provided. First picture information is obtained from a first container, the first picture information being presented as a first picture on a first picture layer. A screenshot picture information is obtained by taking a screenshot of a second container containing a plurality of pictures. The screenshot picture information includes second picture information in the second container, and the second picture information is presented as a second picture on a second picture layer, where the plurality of pictures form sub-pictures of the second picture. The first picture information and the screenshot picture information are combined, to obtain a combined picture of the first picture and the plurality of pictures in a single combining operation.

According to another aspect of the embodiments of this application, a picture processing apparatus is further provided. The apparatus includes a memory storing computer instructions; and a processor coupled to the memory. When executing the computer instructions, the processor is configured to perform: obtaining first picture information from a first container, the first picture information being presented as a first picture on a first picture layer; and obtaining screenshot picture information by taking a screenshot of a second container containing a plurality of pictures. The screenshot picture information includes second picture information in the second container, and the second picture information is presented as a second picture on a second picture layer. The plurality of pictures form sub-pictures of the second picture. The processor is further configured to perform: combining the first picture information and the screenshot picture information, to obtain a combined picture of the first picture and the plurality of pictures in a single combining operation.

According to another aspect of the embodiments of this application, a non-transitory computer-readable storage medium is further provided. The storage medium is configured to store computer program instructions executable by at least one processor to perform: obtaining first picture information from a first container, the first picture information being presented as a first picture on a first picture layer; and obtaining screenshot picture information by taking a screenshot of a second container containing a plurality of pictures. The screenshot picture information includes second picture information in the second container, and the second picture information is presented as a second picture on a second picture layer. The plurality of pictures form sub-pictures of the second picture. The at least one processor is further configured to perform: combining the first picture information and the screenshot picture information, to obtain a combined picture of the first picture and the plurality of pictures in a single combining operation.

According to the disclosed embodiments of this application, the first picture is one picture, the screenshot picture is also one picture, and the screenshot picture includes the second picture information. When the second picture includes multiple sub-pictures, the multiple pictures may be combined through one combining operation. In this way, the technical problem in the existing technology that relatively large amount of memory in a terminal is occupied as a result of multiple number of picture combining operations can be resolved, thereby reducing occupied memory amount.

Other aspects of the present disclosure can be understood by those skilled in the art in light of the description, the claims, and the drawings of the present disclosure.

BRIEF DESCRIPTION OF THE DRAWINGS

The accompanying drawings described herein are used to provide further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

The followings describe the technical solutions of the embodiments of this application with reference to the accompanying drawings. Apparently, the described embodiments are merely some rather than all of the embodiments of this application. Other embodiments obtained by a person of ordinary skill in the art based on the disclosed embodiments of this application without creative efforts shall fall within the protection scope of this application.

It should be noted that, in the specification, claims, and accompanying drawings of this application, the terms "first", "second", and so on are intended to distinguish between similar objects rather than describe a specific order or sequence. It should be understood that the data termed in such a way may be interchangeable in proper circumstances so that the embodiments of this application described herein can be implemented in orders other than the order illustrated or described herein. Moreover, the terms "include", "contain" and other variants mean to cover the non-exclusive inclusion, for example, a process, method, system, product, or device that includes a list of steps or units, and is not necessarily limited to those expressly listed steps or units, but may include other steps or units not expressly listed or inherent to such a process, method, product, or device.

According to one embodiment, a picture processing method implemented by a picture processing apparatus is provided. It should be noted that the steps shown in the flowchart among the accompanying drawings may be performed on a computer system storing computer executable instructions. In addition, although a logical sequence is shown in the flowchart, the steps shown or described may be performed according to a sequence different from the sequence shown in the flowchart.

Figure 1:
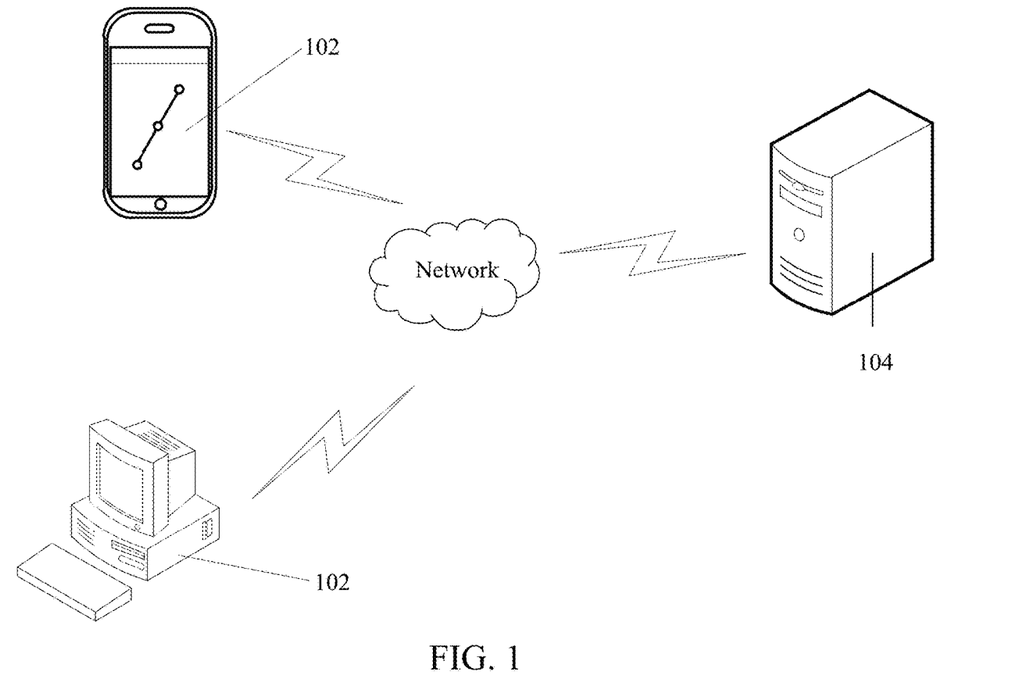
FIG. 1 illustrates a system diagram according to disclosed embodiments.

The picture processing method may be applied to a hardware environment that includes a terminal 102 and a server 104 shown in FIG. 1. As shown in FIG. 1, the terminal 102 is connected to the server 104 by using a network. The network includes but is not limited to: a wide area network, a metropolitan area network, or a local area network. The terminal 102 may be a mobile phone terminal, a PC terminal, a notebook computer terminal or a tablet computer terminal.

In operation of the hardware environment system shown in FIG. 1, the terminal 102 may obtain a base picture and multiple pictures to be superimposed on the base picture, all of which may need to be combined. The base picture and the superimposed pictures may be pictures stored in the terminal 102, or may be pictures obtained from the server 104. The terminal 102 combines the base picture and the multiple superimposed pictures into a single combined picture, and may publish the combined picture on a website by using the network, that is, store the picture in the server 104.

Figure 2:
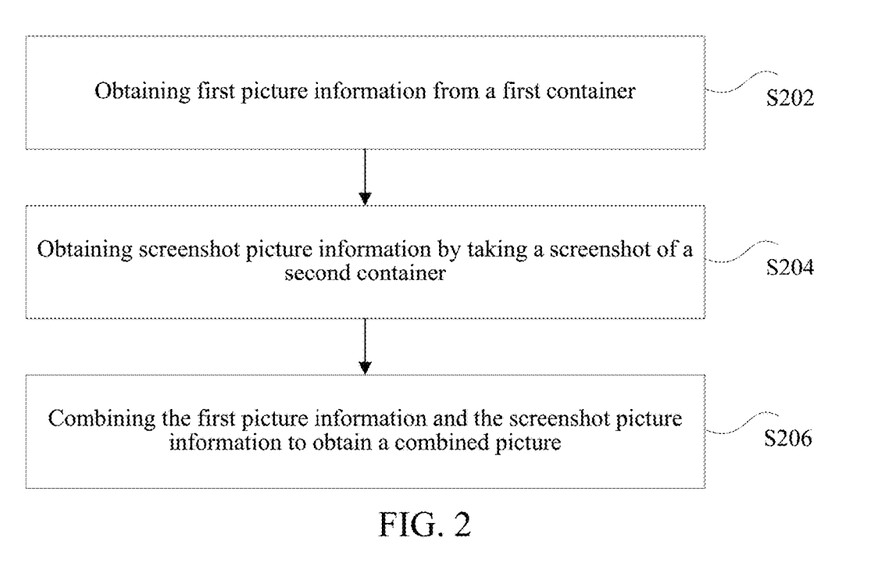
FIG. 2 illustrates a flowchart of a picture processing method according to disclosed embodiments.

As shown in FIG. 2, the picture processing method may include the followings.

Step S202: Obtaining first picture information from a first container, the first picture information being presented as a first picture via a first picture layer.

Figure 3:
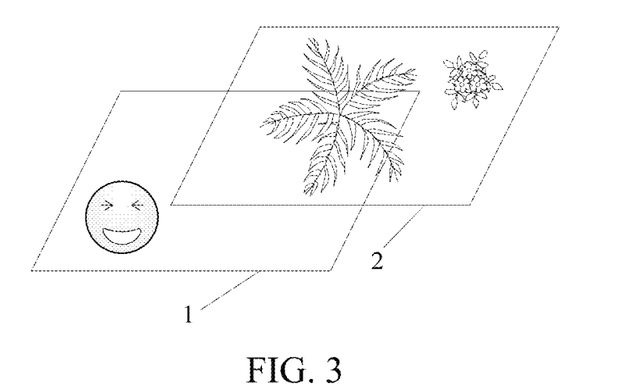
FIG. 3 illustrates a schematic diagram of two picture layers according to disclosed embodiments.

The first picture may be the base picture obtained by the terminal 102 in FIG. 1, such as a smiling face picture shown in FIG. 3. Information about the first picture (i.e., the first picture information) includes the smiling face presented in the first picture, and position of the smiling face in the first picture, etc. The terminal 102 presents the first picture information via the first picture layer, that is, presents the first picture information as the first picture. The first picture layer is picture layer 1 shown in FIG. 3. The first container is used for containing the base picture, and the first container includes information such as the size of the base picture, the position of images in the base picture, or the type of the base picture.

Step S204: Obtaining screenshot picture information obtained by taking a screenshot of a second container, the screenshot picture information including second picture information from the second container, and the second picture information being presented as a second picture via a second picture layer. The second container may contain a plurality of pictures, which form sub-pictures of the second picture The second picture may include the leaf and the flower shown in FIG. 3. The second picture is stored in a form of the second picture information in the second container and is presented on picture layer 2 shown in FIG. 3. The second container and the first container are two different containers.

As shown in FIG. 3, only two sub-pictures (the leaf picture and the flower picture) are used as the second picture. The second picture may include more sub-pictures, all of which being contained in the second container. Further, a screenshot of the second container is taken, and all pictures presented on the second picture layer are presented in the screenshot picture. The screenshot picture is the same as the pictures shown on picture layer 2. That is, the screenshot picture information includes the second picture information presented on the second picture layer.

Step S206: Combining the first picture information and the screenshot picture information to obtain a combined picture.

Figure 4:
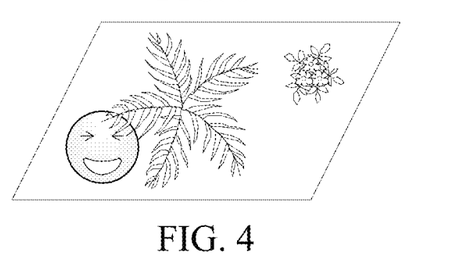
FIG. 4 illustrates a schematic diagram of a combined picture according to disclosed embodiments.

The combined picture is shown in FIG. 4. Because the first picture is one picture, the screenshot picture is also one picture, and the screenshot picture includes the second picture information, when the second picture includes multiple sub-pictures, the multiple sub-pictures may be combined through one combining operation. That is, the first picture and the plurality of pictures in the second container can be combined in a single combining operation.

In this way, the technical problem in the existing technology that relatively large amount of memory in a terminal is occupied as a result of multiple combining operation can be resolved, thereby reducing memory occupation. In addition, because of the reduction of picture combining operations, picture combining efficiency is improved.

For example, a user needs to superimpose multiple pictures on the base picture shown in FIG. 3, and the superimposed pictures are the leaf picture and the flower picture shown in FIG. 3. The base picture is contained in the first container. When displaying the base picture, the terminal performs a rendering operation on the first container, so as to display the base picture on the first picture layer, that is, to display the smiling face picture on a screen of the terminal. The leaf picture and the flower picture are contained in the second container. When displaying the leaf picture and the flower picture, the terminal performs the rendering operation on the second container to display the leaf picture and the flower picture on the second picture layer, that is, to display the leaf picture and the flower picture on the screen of the terminal. Usually, the second picture layer is above the first picture layer, so that a part of the picture on the first picture layer may be covered by the picture on the second picture layer.

Figure 5:
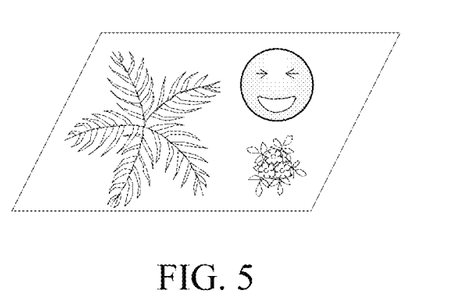
FIG. 5 illustrates a schematic diagram of another combined picture according to another embodiment of this application.

The user may put the second picture at any position on the second picture layer, and a combined picture is shown in FIG. 4. A part of the smiling face picture is covered by the leaf picture. The user may further adjust the position at which the second picture is displayed on the second picture layer, and a combined picture obtained by adjusting the position of the second picture is shown in FIG. 5.

It should be noted that, if the user selects the leaf picture as the second picture and puts the leaf picture into the second container, the leaf picture is displayed at a default position on the second picture layer, for example, at a middle position on the second picture layer. Then, the user may adjust the default position to the position shown in FIG. 4 or FIG. 5, or to another position. Alternatively, the user may directly drag the leaf picture to any position on the second picture layer. Other position may also be used.

Optionally, the obtaining screenshot picture information by taking a screenshot of the second container may further include: obtaining the second picture information and position information of the second picture, the position information of the second picture being used for indicating the position of the second picture on the second picture layer; and generating the screenshot picture information according to the second picture information and the position information of the second picture, including the sub-pictures.

The second container may be a computer program used for managing and controlling the second picture, for example, recording a relationship between positions of multiple sub-pictures included in the second picture, the position of the second picture on the second picture layer, the second picture information, and the like.

The screenshot picture information may be generated by copying the second picture information and the position information of the second picture. Alternatively, new screenshot picture information may be generated according to the second picture information and the position information of the second picture. In one embodiment, to generate the screenshot picture information, an API of the terminal may be invoked (for taking a screenshot), and a screenshot operation is performed on the second container using the API of the terminal.

It should be noted that, the first container is not affected when the screenshot of the second container is taken, so that the screenshot picture information does not include the first picture information that is in the first container. In this way, when combining the first picture and the screenshot picture, confusion of picture information is avoided because there is no first picture information in the screenshot picture information.

Optionally, the second picture includes a first sub-picture and a second sub-picture, and the generating the screenshot picture information according to the second picture information and the position information of the second picture includes: determining whether the first sub-picture overlaps the second sub-picture; and generating, if the first sub-picture overlaps the second sub-picture, screenshot picture information including the first sub-picture information and partial second sub-picture information, the partial second sub-picture information being information about a part of the second sub-picture not overlapped by the first sub-picture.

That is, when the first sub-picture overlaps the second sub-picture, if the first sub-picture is above the second sub-picture, the screenshot picture information includes the first sub-picture information and information about the part of the second sub-picture not overlapped by the first sub-picture. Similarly, the second sub-picture can overlap the first sub-picture and is above the first sub-picture, the screenshot picture information includes the second sub-picture information and information about the part of the first sub-picture not overlapped by the second sub-picture.

Figure 6:
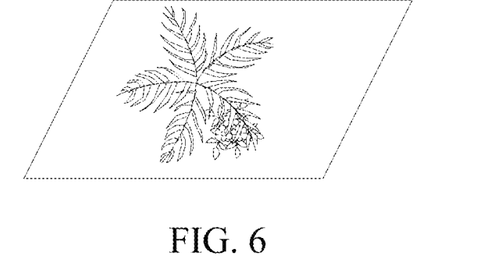
FIG. 6 illustrates a schematic diagram of two overlapped sub-pictures according to disclosed embodiments.

When the part overlapped of the picture is not displayed in the screenshot picture, the screenshot picture information is the same as the picture information displayed on the screen of the terminal. Therefore, after the first picture and the screenshot picture are combined, the combined picture is the same as the content displayed on the screen of the terminal. For example, in FIG. 6, a leaf picture and a flower picture are overlapped, with the leaf picture above the flower picture. A picture displayed on the screen is shown in FIG. 6, and a screenshot picture is also the same as shown in FIG. 6.

Optionally, before the obtaining screenshot picture information is obtained by taking a screenshot of a second container, the picture processing method further includes: creating the second container; performing a rendering operation on the second container to obtain the second picture layer, which covers the first picture layer, where the first picture is located, with a pre-determined transparency; and receiving the second picture by using the second container. The picture information of the second picture received by the second container is presented on the second picture layer.

The first picture layer is obtained by performing a rendering operation on the first container, and the second picture layer is obtained by performing a rendering operation on the second container. The first picture layer is usually an opaque layer. Alternatively, the first picture layer may be processed to be a picture layer having a specific transparency for displaying the first picture. The second picture layer may be a transparent layer, or may be a layer having a specific transparency. When the first picture on the first picture layer and the second picture the second picture layer need to be displayed on the terminal, and the second picture layer does not cover the first picture, the second picture layer is set to be a transparent layer or a translucent layer. In one embodiment, to display the first picture during the combining operation and outline the first picture and the second picture, the first picture layer is an opaque layer and the second picture layer a transparent layer.

The transparency of the second picture layer does not affect the transparency of the second picture, and the transparency of the second picture and the transparency of the second picture layer may be set separately. For example, a second picture having a specific transparency is displayed on a transparent second picture layer. Alternatively, an opaque second picture is displayed on a transparent second picture layer. By displaying an opaque second picture on a transparent second picture layer, the second picture on the second picture layer may be displayed over the first picture layer, so that the picture displayed on the first picture layer and the picture displayed on the second picture layer form one image. By combining the first picture information and the screenshot picture information, the first picture and the screenshot picture can form one picture, thereby displaying picture information that is a combination of the first picture information and the second picture information.

For example, a picture displayed on the screen of the terminal is shown in FIG. 4. A smiling face picture is displayed on the first picture layer, and the leaf picture and the flower picture are displayed on the second picture layer. After the screenshot of the second container is taken, information about the obtained screenshot picture and the first picture information are combined. A combined picture is also shown in FIG. 4. That is, the picture displayed on the screen of the terminal is the same as the combined picture. That is, the user observes the pictures on the screen. After adjusting the second picture to an appropriate position and performing the combining operation, a combined picture is the same as the picture displayed on the screen of the terminal.

After creating the second container, all sub-pictures of the second picture are contained in the second container. Positions of the sub-pictures contained in the second container on the second picture layer may be adjusted. For example, two sub-pictures may be disposed in parallel or may be overlapped.

Optionally, the creating the second container may include: obtaining size information of the first picture and position information of the first picture, the size information being used for indicating the size of the first picture, and the position information of the first picture being used for indicating the position at which the first picture is displayed on the first picture layer; and creating the second container according to the size information and the position information of the first picture, where the size of the second picture layer is the same as the size indicated by the size information, and the position of the second picture layer is the same as the position indicated by the position information of the first picture.

When creating the second container, the size of the second picture layer obtained by performing the rendering operation on the second container is the same as the size of the first picture, so as to ensure that the second picture layer can completely cover the first picture. In this way, the second picture is within an effective range of the first picture wherever the second picture is disposed on the second picture layer. After the first picture is loaded, a presentation type (including the length-to-width ratio) of the first picture is obtained, and the first picture is centered for displaying according to the presentation type, so that the size of the first picture and the position of the first picture are determined. The position of the first picture may be determined according to an x coordinate (e.g., horizontal coordinate) and a y coordinate (e.g., vertical coordinate) in the upper left corner of the screen. The second container is created according to the obtained information of the first picture, so that the size and position of the second picture layer obtained by performing the rendering operation on the second container are the same as the size and position of the first picture, and the second picture layer can completely overlap the first picture.

Optionally, the obtaining screenshot picture information by taking a screenshot of the second container includes: sending indication information to the second container, the indication information being used for indicating to adjust the position of the second picture on the second picture layer and the size of the second picture; and controlling the second container to adjust, according to the indication information, the position of the second picture to the position indicated by the indication information, and to adjust the size of the second picture to the size indicated by the indication information.

The terminal may receive the indication information sent by the user using the screen, and then sends the indication information to the second container. The second container adjusts the position of the second picture on the second picture layer and the size of the second picture according to the indication information. When adjusting the position of the second picture and the size of the second picture, the second container records the size of the second picture and the position of the second picture on the second picture layer. Therefore, when performing the rendering operation on the second container to present the second picture, the size and the position of the presented second picture are the same as the size and the position indicated by the indication information.

Thus, according to the disclosed embodiments, a first picture and a second picture are placed in two containers, and there are multiple sub-pictures in a second container in which the second picture is contained. Screenshot picture information including second picture information is obtained after taking a screenshot of the second container. First picture information and the screenshot picture information are then combined, so that a combined picture is obtained. Because pictures are combined through one combining operation, the technical problems that relatively large amount of memory is occupied and combining efficiency is relatively low can be avoided. In this way, the amount of memory used is reduced and combining efficiency is improved.

It should be noted that, to simplify the description, the foregoing method is described as a series of actions. But a person of ordinary skill in the art should know that this application is not limited to any described sequence of the actions, as some steps may be performed in other sequences or can be performed simultaneously according to this application. Secondarily, a person skilled in the art should know that the embodiments described in the specification are examples, and the described actions and modules are not all necessary for this application.

The disclosed embodiments may be implemented by software, hardware, or a combination of software and hardware. For example, when implemented in a form of a software product, the computer software product may be stored in a storage medium (such as an ROM/RAM, a magnetic disk, or an optical disc), and includes computer instructions for instructing a terminal device (which may be a mobile phone, a computer, a server, a network device, and the like) to perform the method described in the embodiments of this application.

Figure 7:
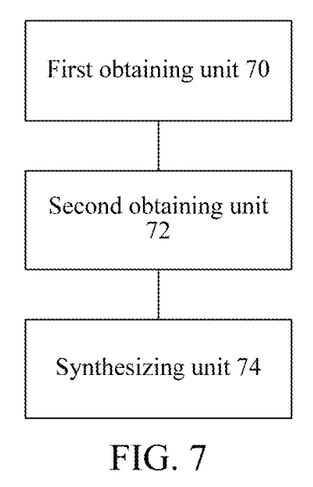
FIG. 7 illustrates a schematic diagram of a picture processing apparatus according to disclosed embodiments.
Figure 8:
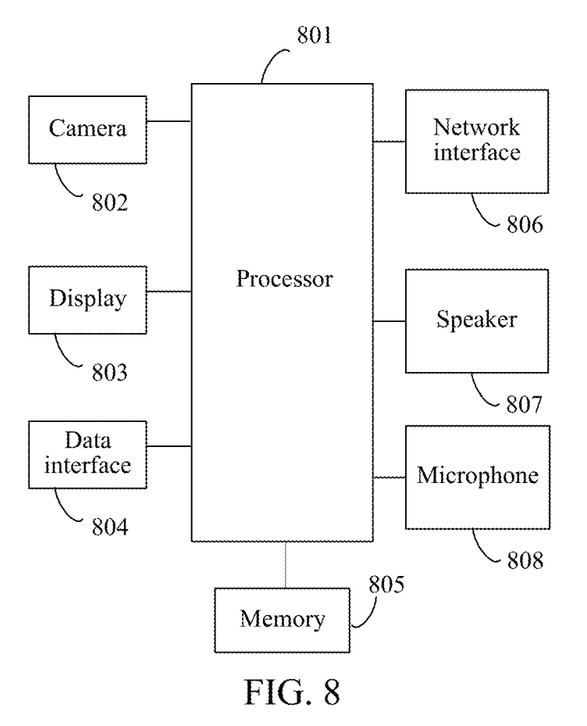
FIG. 8 illustrates a structural diagram of a terminal according to disclosed embodiments.

According to another embodiment, a picture processing apparatus for performing the foregoing picture processing method is further provided, which may be implemented by the terminal shown in FIG. 8 (e.g., the processor with memory and other peripheral devices). As shown in FIG. 7, the apparatus includes: a first obtaining unit 70, a second obtaining unit 72, and a combining unit 74.

The first obtaining unit 70 is configured to obtain first picture information from a first container, the first picture information being presented as a first picture on a first picture layer.

The first picture may be the base picture obtained by the terminal 102 in FIG. 1, such as a smiling face picture shown in FIG. 3. Information about the first picture includes the smiling face presented in the first picture and the position of the smiling face in the first picture. The terminal 102 presents the first picture information on the first picture layer, that is, presents the first picture information as the first picture. The first picture layer is picture layer 1 shown in FIG. 3. The first container is used for containing the base picture information such as the size of the base picture, the position of an image in the base picture, or the type of the base picture.

The second obtaining unit 72 is configured to obtain screenshot picture information by taking a screenshot of the second container, the screenshot picture information including second picture information in the second container, and the second picture information being presented as a second picture on a second picture layer.

The second picture may be a leaf picture and a flower picture shown in FIG. 3. The second picture is stored in a form of the second picture information in the second container and is presented on picture layer 2 shown in FIG. 3. The second container and the first container are two separate containers. In FIG. 3, only two sub-pictures (the leaf picture and the flower picture) used as the second picture are shown. The second picture may include more sub-pictures, all of which are contained in the second container. A screenshot of the second container is taken, and all pictures presented on the second picture layer are presented in the screenshot picture. The screenshot picture is the same as the pictures shown on picture layer 2. That is, the screenshot picture information includes the second picture information presented on the second picture layer.

The combining unit 74 is configured to combine the first picture information and the screenshot picture information to obtain a combined picture.

The combined picture is shown in FIG. 4. Because the first picture is one picture, the screenshot picture is also one picture, and the screenshot picture includes the second picture information, when the second picture includes multiple sub-pictures, the multiple pictures may be combined through one combining operation. In this way, the technical problem in the existing technology that relatively large amount of memory in a terminal is occupied as a result of multiple times of picture combining is resolved, thereby reducing the amount of memory occupied. In addition, due to the reduction of picture combining operation, picture combining efficiency is improved.

For example, a user needs to superimpose multiple pictures on the base picture shown in FIG. 3. The superimposed pictures are the leaf picture and the flower picture shown in FIG. 3. The base picture is contained in the first container. When displaying the base picture, the terminal performs a rendering operation on the first container to display the base picture on the first picture layer, that is, to display the smiling face picture on a screen of the terminal. The leaf picture and the flower picture are contained in the second container. When displaying the leaf picture and the flower picture, the terminal performs the rendering operation on the second container to display the leaf picture and the flower picture on the second picture layer, that is, to display the leaf picture and the flower picture on the screen of the terminal. Usually, the second picture layer is above the first picture layer, so that a part of the picture on the first picture layer may be covered by the picture on the second picture layer.

The user may put the second picture at any position on the second picture layer, and a combined picture is shown in FIG. 4. A part of the smiling face picture is covered by the leaf picture. The user may further adjust the position at which the second picture is displayed on the second picture layer, and a combined picture obtained after adjusting the position of the second picture is shown in FIG. 5.

It should be noted that, if the user selects the leaf picture as the second picture and puts the leaf picture into the second container, the leaf picture is displayed at a default position on the second picture layer, for example, at a middle position on the second picture layer. Then, the user may adjust the default position to the position shown in FIG. 4 or FIG. 5, or to another position. Alternatively, the user may directly drag the leaf picture to any position on the second picture layer. Other ways may also be used.

Optionally, the second obtaining unit 72 includes: a first obtaining module and a generation module. The first obtaining module is configured to obtain the second picture information and position information of the second picture, the position information of the second picture being used for indicating the position of the second picture on the second picture layer; and the generation module configured to generate the screenshot picture information according to the second picture information and the position information of the second picture.

The second container may be a computer program used for managing and controlling the second picture, for example, recording relationship between positions of multiple sub-pictures included in the second picture, the position of the second picture on the second picture layer, the second picture information, and the like.

The screenshot picture information may be generated by copying the second picture information and the position information of the second picture. Alternatively, new screenshot picture information may be generated according to the second picture information and the position information of the second picture. In one embodiment, to generate the screenshot picture information, an API of the terminal may be invoked (for taking a screenshot), and the API of the terminal is used to perform the screenshot operation of the second container.

It should be noted that, the first container is not affected when the screenshot of the second container is taken, so that the screenshot picture information does not include the first picture information that is in the first container. In this way, when combining the first picture and screenshot picture, because there is no first picture information in the screenshot picture information, confusion of picture information is avoided.

Optionally, the second picture includes a first sub-picture and a second sub-picture, and the generation module includes a sub-determining module, configured to determine whether the first sub-picture overlaps the second sub-picture; and a sub-generation module, configured to generate, if the first sub-picture overlaps the second sub-picture, screenshot picture information including the first sub-picture information and partial second sub-picture information, the partial second sub-picture information being information about a part of the second sub-picture not overlapped by the first sub-picture.

That is, when the first sub-picture overlaps the second sub-picture, if the first sub-picture is above the second sub-picture, the screenshot picture information includes the first sub-picture information and information about the part of the second sub-picture not overlapped by the first sub-picture. Similarly, the second sub-picture can overlap the first sub-picture and is above the first sub-picture, the screenshot picture information includes the second sub-picture information and information about the part of the first sub-picture not overlapped by the second sub-picture.

When the part overlapped of the picture is not displayed in the screenshot picture, the screenshot picture information is the same as the picture information displayed on the screen of the terminal. Therefore, after the first picture and the screenshot picture are combined, the combined picture is the same as the content displayed on the screen of the terminal. For example, in FIG. 6, a leaf picture and a flower picture are overlapped, with the leaf picture above the flower picture. A picture displayed on the screen is shown in FIG. 6, and a screenshot picture is also the same as shown in FIG. 6.

Optionally, the apparatus further includes: a creation unit, configured to: before obtaining screenshot picture information by taking a screenshot of the second container, create the second container, where the second picture layer obtained by performing a rendering operation on the second container to obtain the second picture layer, which covers the first picture layer, where the first picture is located, with a pre-determined transparency; and a receiving unit, configured to receive the second picture by using the second container, where picture information of the second picture received by the second container is presented on the second picture layer.

The first picture layer is obtained by performing a rendering operation on the first container, and the second picture layer is obtained by performing a rendering operation on the second container. The first picture layer is usually an opaque layer. Alternatively, the first picture layer may be processed to be a layer having a specific transparency for displaying the first picture. The second picture layer may be a transparent layer, or may be a layer having a specific transparency. When the first picture on the first picture layer and the second picture the second picture layer need to be displayed on the terminal, and the second picture layer does not cover the first picture, the second picture layer is set to be a transparent layer or a translucent layer. In one embodiment, to display the first picture during the combining operation and outline the first picture and the second picture, the first picture layer is an opaque layer and the second picture layer a transparent layer.

The transparency of the second picture layer does not affect the transparency of the second picture, and the transparency of the second picture and the transparency of the second picture layer may be separately set. For example, a second picture having a specific transparency is displayed on a transparent second picture layer. Alternatively, an opaque second picture is displayed on a transparent second picture layer. By displaying an opaque second picture on a transparent second picture layer, the second picture on the second picture layer may be displayed on the first picture layer, so that the picture displayed on the first picture layer and the picture displayed on the second picture layer form one image. By combining the first picture information and the screenshot picture information, the first picture and the screenshot picture form one picture, thereby displaying picture information that is a combination of the first picture information and the second picture information.

For example, a picture displayed on the screen of the terminal is shown in FIG. 4. A smiling face picture is displayed on the first picture layer, and the leaf picture and the flower picture are displayed on the second picture layer. After the screenshot of the second container is taken, information about an obtained screenshot picture and the first picture information are combined. A combined picture is also shown in FIG. 4. That is, the picture displayed on the screen of the terminal is the same as the combined picture. That is, the user observes the pictures on the screen. After adjusting the second picture to an appropriate position and performing the combining operation, a combined picture is the same as the picture displayed on the screen of the terminal.

After creating the second container, all sub-pictures of the second picture are contained in the second container. Positions of the sub-pictures contained in the second container on the second picture layer may be adjusted. For example, two sub-pictures may be disposed in parallel or may be overlapped.

Optionally, the creation unit includes: a second obtaining module, configured to obtain size information of the first picture and position information of the first picture, the size information being used for indicating the size of the first picture, and the position information of the first picture being used for indicating the position at which the first picture is displayed on the first picture layer; and a creation module, configured to create the second container according to the size information and the position information of the first picture, where the size of the second picture layer is the same as the size indicated by the size information, and the position of the second picture layer is the same as the position indicated by the position information of the first picture.

When creating the second container, the size of the second picture layer obtained by performing the rendering operation on the second container is the same as the size of the first picture, so as to ensure that the second picture layer can completely cover the first picture. In this way, the second picture is within an effective range of the first picture wherever the second picture is disposed on the second picture layer. After the first picture is loaded, a presentation type (including the length-to-width ratio) of the first picture is obtained, and the first picture is centered for displaying according to the presentation type, so that the size of the first picture and the position of the first picture are determined. The position of the first picture may be determined according to an x coordinate and a y coordinate in the upper left corner of the screen. The second container is created according to the obtained information of the first picture, so that the size and position of the second picture layer obtained by performing the rendering operation on the second container are the same as those of the first picture, and the second picture layer can completely overlap the first picture.

Optionally, the second obtaining unit includes: a sending module, configured to send indication information to the second container, the indication information being used for indicating to adjust the position of the second picture on the second picture layer and the size of the second picture; and a control module, configured to control the second container to: adjust, according to the indication information, the position of the second picture to the position indicated by the indication information, and adjust the size of the second picture to the size indicated by the indication information.

The terminal may receive the indication information sent by the user using the screen, and then sends the indication information to the second container. The second container adjusts the position of the second picture on the second picture layer and the size of the second picture according to the indication information. When adjusting the position of the second picture and the size of the second picture, the second container records the size of the second picture and the position of the second picture on the second picture layer. Therefore, when performing the rendering operation on the second container to present the second picture, the size and the position of the presented second picture are the same as the size and the position indicated by the indication information.

Thus, according to the disclosed embodiments, a first picture and a second picture are placed in two containers, and there are multiple sub-pictures in a second container in which the second picture is contained. Screenshot picture information including second picture information is obtained after taking a screenshot of the second container. First picture information and the screenshot picture information are then combined, so that a combined picture is obtained. Because pictures are combined through one combining operation, the technical problems that relatively large amount of memory is occupied and combining efficiency is relatively low can be avoided. In this way, the amount of memory used is reduced and combining efficiency is improved.

According to one embodiment, a terminal for performing the foregoing picture processing method is further provided. As shown in FIG. 8, the terminal includes: a processor 801, a camera 802, a display 803, a data interface 804, a memory 805, a network interface 806, a speaker 807, and a microphone 808.

The camera 802 may be configured to collect images from a user. The display 803 may be configured to display a first picture and a second picture, from the images collected or any other sources. The data interface 804 may transmit, by means of data transmission, a picture recorded by a third-party tool to the processor 801. The third-party tool may be a camera device.

The memory 805 may be configured to store a first picture and a second picture. The network interface 806 may be configured to communicate with a server, to receive the second picture sent by the server. The speaker 807 may be configured to play an audio signal. The microphone 808 may be configured to record the audio.

The processor 801 may be configured to perform the following operations: obtaining first picture information from a first container, the first picture information being presented as a first picture on a first picture layer; obtaining screenshot picture information by taking a screenshot of a second container, the screenshot picture information including second picture information in the second container, and the second picture information being presented as a second picture on a second picture layer; and combining the first picture information and the screenshot picture information, to obtain a combined picture to be outputted.

For obtaining screenshot picture information by taking a screenshot of a second container, the processor 801 is further configured to perform the following operations: obtaining the second picture information and position information of the second picture, the position information of the second picture being used for indicating a position of the second picture on the second picture layer; and generating the screenshot picture information according to the second picture information and the position information of the second picture.

In one embodiment, the second picture includes a first sub-picture and a second sub-picture, for generating the screenshot picture information according to the second picture information and the position information of the second picture, the processor 801 is further configured to perform the following operations: determining whether the first sub-picture overlaps the second sub-picture; and generating, if the first sub-picture overlaps the second sub-picture, screenshot picture information including the first sub-picture information and partial second sub-picture information, the partial second sub-picture information being information about a part of the second sub-picture not overlapped by the first sub-picture.

Before obtaining screenshot picture information by taking a screenshot of a second container, the processor 801 is further configured to perform the following operations: creating the second container, where the second picture layer obtained by performing a rendering operation on the second container covers, with a pre-determined transparency, the first picture layer on which the first picture is located; and receiving the second picture by using the second container, where picture information of the second picture received by the second container is presented on the second picture layer.

For creating the second container, the processor 801 is further configured to perform the following operations: obtaining size information of the first picture and position information of the first picture, the size information being used for indicating a size of the first picture, and the position information of the first picture being used for indicating the position at which the first picture is displayed on the first picture layer; and creating the second container according to the size information and the position information of the first picture, where the size of the second picture layer is the same as the size indicated by the size information, and the position of the second picture layer is the same as the position indicated by the position information of the first picture.

For obtaining screenshot picture information by taking a screenshot of a second container, the processor 801 is further configured to perform the following operations: sending indication information to the second container, the indication information being used for indicating to adjust a position of the second picture on the second picture layer and a size of the second picture; and controlling the second container to: adjust, according to the indication information, the position of the second picture to the position indicated by the indication information, and adjust the size of the second picture to the size indicated by the indication information.

According to another embodiment, it is further provided a storage medium. Optionally, in this embodiment, the foregoing storage medium may be located in at least one of multiple network devices in a computer network.

Optionally, in this embodiment, the storage medium is configured to store program instructions for performing a picture processing method including the followings: obtaining first picture information from a first container, the first picture information being presented as a first picture on a first picture layer; obtaining screenshot picture information by taking a screenshot of a second container, the screenshot picture information including second picture information in the second container, and the second picture information being presented as a second picture on a second picture layer; and combining the first picture information and the screenshot picture information, to obtain a combined picture.

Optionally, for obtaining screenshot picture information by taking a screenshot of a second container, the storage medium is further configured to store program instructions for performing the followings: obtaining the second picture information and position information of the second picture, the position information of the second picture being used for indicating a position of the second picture on the second picture layer; and generating the screenshot picture information according to the second picture information and the position information of the second picture.

Optionally, the second picture includes a first sub-picture and a second sub-picture and, for generating the screenshot picture information according to the second picture information and the position information of the second picture, the storage medium is further configured to store program instructions for performing the followings: determining whether the first sub-picture overlaps the second sub-picture; and generating, if the first sub-picture overlaps the second sub-picture, screenshot picture information including the first sub-picture information and partial second sub-picture information, the partial second sub-picture information being information about a part of the second sub-picture not overlapped by the first sub-picture.

Optionally, before obtaining screenshot picture information by taking a screenshot of a second container, the storage medium is further configured to store program instructions for performing the followings: creating the second container, where the second picture layer obtained by performing a rendering operation on the second container covers, with a pre-determined transparency, the first picture layer on which the first picture is located; and receiving the second picture by using the second container, where picture information of the second picture received by the second container is presented on the second picture layer.

Optionally, for creating the second container, the storage medium is further configured to store program instructions for performing the followings: obtaining size information of the first picture and position information of the first picture, the size information being used for indicating a size of the first picture, and the position information of the first picture being used for indicating a position at which the first picture is displayed on the first picture layer; and creating the second container according to the size information and the position information of the first picture, where a size of the second picture layer is the same as the size indicated by the size information, and a position of the second picture layer is the same as the position indicated by the position information of the first picture.

Optionally, for obtaining screenshot picture information by taking a screenshot of a second container, the storage medium is further configured to store program instructions for performing the followings: sending indication information to the second container, the indication information being used for indicating to adjust a position of the second picture on the second picture layer and a size of the second picture; and controlling the second container to: adjust, according to the indication information, the position of the second picture to a position indicated by the indication information, and adjust the size of the second picture to a size indicated by the indication information.

Optionally, in certain embodiments, the storage medium may include but is not limited to a medium that may store program code such as a USB flash drive, a read-only memory (ROM), a random access memory (RAM), a removable hard disk, a magnetic disk, or an optical disk.

The sequence numbers of the foregoing embodiments of this application are merely for description, and do not imply the preference among the embodiments.

When being implemented in a form of a software functional unit and sold or used as an independent product, the integrated unit in the foregoing embodiments may be stored in the foregoing computer-readable storage medium. Based on such an understanding, the technical solutions of this application may be implemented in the form of a software product. The computer software product is stored in a storage medium and includes instructions for instructing a computer device (which may be a personal computer, a server, a network device, or the like) to perform all or some of the steps of the methods in the embodiments of this application.

In the several embodiments provided in this application, it should be understood that the disclosed terminal (e.g., client terminal) may be implemented in other manners, and the described apparatus embodiment is merely exemplary. For example, the unit division is merely logical function division and may be other division in actual implementation. For example, multiple units or components may be combined or integrated into another system, or some features may be omitted or not performed. In addition, the displayed or discussed mutual couplings or direct couplings or communication connections may be implemented by using some interfaces. The indirect couplings or communication connections between the units or modules may be implemented in electronic or other forms.

The foregoing descriptions are merely implementations of this application. It should be noted that a person of ordinary skill in the art may make improvements and changes without departing from the principle of this application, and such improvements and changes should all fall within the protection scope of this application.

What is claimed is:

1. A picture processing method, comprising:
    obtaining first picture information from a first container, the first picture information being presented as a first picture on a first picture layer, the first picture information including at least one of size information of the first picture and position information of the first picture on the first picture layer;
    creating a second container according to the first picture information;
    inputting into the second container first and second sub-pictures respectively presented on first and second sub-layers;
    combining within the second container the first and second sub-pictures by overlaying the first and second sub-layers;
    obtaining second picture information by taking a screenshot of the second container, and the second picture information being presented as a second picture on a second picture layer, wherein the second picture includes the first and second sub-pictures; and
    combining the first picture information and the second picture information to obtain a combined picture of the first picture and the second picture.

2. The method according to claim 1, wherein obtaining the second picture information comprises:
    determining whether the first sub-picture overlaps the second sub-picture;
    generating, if the first sub-picture overlaps the second sub-picture, screenshot picture information including first sub-picture information and partial second sub-picture information, the partial second sub-picture information being information about a part of the second sub-picture not overlapped by the first sub-picture; and
    obtaining the second picture information from the screenshot picture information.

3. The method according to claim 1, wherein obtaining the second picture information comprises:
    creating the second container;
    performing a rendering operation on the second container to obtain the second picture layer;
    positioning the second picture layer on top of at least a portion of the first picture layer;
    performing a second rendering operation on the second container to obtain the second picture; and
    presenting the second picture on the second picture layer.

4. The method according to claim 1, wherein obtaining second picture information comprises:
    sending indication information to the second container to adjust at least one of a position of the second picture on the second picture layer and a size of the second picture; and
    controlling the second container to:
        adjust, according to the indication information, the position of the second picture to an indicated position according to the indication information; and
        adjust the size of the second picture to an indicated size according to the indication information.

5. The method according to claim 1, wherein the second picture information further includes position information of at least one of the first sub-picture and the second sub-picture.

6. The method according to claim 1, further comprising:
    presenting the second picture layer in a size according to the size information of the first picture; and
    presenting the second picture layer at a position according to the position information of the first picture.

7. The method according to claim 1, wherein, in presenting the combined picture, the second picture layer is positioned on top of the first picture layer with an overlapping area corresponding to a first area of the first picture layer and a second area of the second picture layer, the first area being more opaque than the second area.

8. A picture processing system, comprising: a memory storing computer instructions; and a processor coupled to the memory and, when executing the computer instructions, configured to perform:
    obtaining first picture information from a first container, the first picture information being presented as a first picture on a first picture layer, the first picture information including at least one of size information of the first picture and position information of the first picture on the first picture layer;
    creating a second container according to the first picture information;
    inputting into the second container first and second sub-pictures respectively presented on first and second sub-layers;
    combining within the second container the first and second sub-pictures by overlaying the first and second sub-layers;
    obtaining second picture information by taking a screenshot of the second container, and the second picture information being presented as a second picture on a second picture layer, wherein the second picture includes the first and second sub-pictures; and
    combining the first picture information and the second picture information to obtain a combined picture of the first picture and the second picture.

9. The system according to claim 8, wherein obtaining the second picture information comprises:
    determining whether the first sub-picture overlaps the second sub-picture;
    generating, if the first sub-picture overlaps the second sub-picture, screenshot picture information including first sub-picture information and partial second sub-picture information, the partial second sub-picture information being information about a part of the second sub-picture not overlapped by the first sub-picture; and
    obtaining the second picture information from the screenshot picture information.

10. The system according to claim 8, wherein obtaining the second picture information comprises:
    creating the second container;
    performing a rendering operation on the second container to obtain the second picture layer;
    positioning the second picture layer on top of at least a portion of the first picture layer;
    performing a second rendering operation on the second container to obtain the second picture; and
    presenting the second picture on the second picture layer.

11. The system according to claim 8, wherein obtaining the second picture information comprises:
    sending indication information to the second container to adjust at least one of a position of the second picture on the second picture layer and a size of the second picture; and
    controlling the second container to:
        adjust, according to the indication information, the position of the second picture to an indicated position according to the indication information; and
        adjust the size of the second picture to an indicated size according to the indication information.

12. A non-transitory computer-readable storage medium storing computer program instructions executable by at least one processor to perform:
    obtaining first picture information from a first container, the first picture information being presented as a first picture on a first picture layer, the first picture information including at least one of size information of the first picture and position information of the first picture on the first picture layer;
    creating a second container according to the first picture information;
    inputting into the second container first and second sub-pictures respectively presented on first and second sub-layers;
    combining within the second container the first and second sub-pictures by overlaying the first and second sub-layers;
    obtaining second picture information by taking a screenshot of the second container, and the second picture information being presented as a second picture on a second picture layer, wherein the second picture includes the first and second sub-pictures; and
    combining the first picture information and the second picture information, to obtain a combined picture of the first picture and the second picture.

13. The non-transitory computer-readable storage medium according to claim 12, wherein obtaining the second picture information comprises:
    determining whether the first sub-picture overlaps the second sub-picture;
    generating, if the first sub-picture overlaps the second sub-picture, screenshot picture information including first sub-picture information and partial second sub-picture information, the partial second sub-picture information being information about a part of the second sub-picture not overlapped by the first sub-picture; and
    obtaining the second picture information from the screenshot picture information.

14. The non-transitory computer-readable storage medium according to claim 12, wherein obtaining the second picture information comprises:
    determining whether the first sub-picture overlaps the second sub-picture;
    generating, if the first sub-picture overlaps the second sub-picture, screenshot picture information including first sub-picture information and partial second sub-picture information, the partial second sub-picture information being information about a part of the second sub-picture not overlapped by the first sub-picture; and
    obtaining the second picture information from the screenshot picture information.

15. The non-transitory computer-readable storage medium according to claim 12, wherein obtaining second picture information comprises:
    sending indication information to the second container to adjust at least one of a position of the second picture on the second picture layer and a size of the second picture; and
    controlling the second container to:
        adjust, according to the indication information, the position of the second picture to an indicated position according to the indication information; and
        adjust the size of the second picture to an indicated size according to the indication information.

* * * * *